(12) United States Patent
Seo et al.

(10) Patent No.: US 7,910,869 B2
(45) Date of Patent: Mar. 22, 2011

(54) LASER PROCESSING APPARATUS USING DISTINCT HORIZONTAL AND VERTICAL DATA SETS

(75) Inventors: Manabu Seo, Kanagawa (JP); Yasufumi Yamada, Kanagawa (JP); Yoshihiro Norikane, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 424 days.

(21) Appl. No.: 10/582,895

(22) PCT Filed: Oct. 12, 2005

(86) PCT No.: PCT/JP2005/019158
§ 371 (c)(1),
(2), (4) Date: Jun. 13, 2006

(87) PCT Pub. No.: WO2006/041191
PCT Pub. Date: Apr. 20, 2006

(65) Prior Publication Data
US 2009/0147330 A1    Jun. 11, 2009

(30) Foreign Application Priority Data
Oct. 13, 2004  (JP) .................................. 2004-298837

(51) Int. Cl.
*G01J 1/20* (2006.01)
*H01L 27/00* (2006.01)
*G03H 1/08* (2006.01)
(52) U.S. Cl. ...................... 250/201.9; 250/208.1; 359/9
(58) Field of Classification Search ............... 250/208.1, 250/201.9, 550, 216, 201.8; 359/1, 9, 10, 359/11, 27, 30, 31, 554–557; 348/40; 372/108, 372/18, 42, 96, 98–106; 349/200, 57, 74, 61, 1–4
See application file for complete search history.

(56) References Cited

U.S. PATENT DOCUMENTS

| 5,343,415 | A | * | 8/1994 | Itoh et al. ........................ 708/400 |
| 5,497,254 | A | * | 3/1996 | Amako et al. .................... 349/74 |
| 5,589,955 | A | * | 12/1996 | Amako et al. ..................... 359/9 |
| 5,699,185 | A | | 12/1997 | MacDonald et al. |
| 6,717,104 | B2 | * | 4/2004 | Thompson et al. ....... 219/121.73 |

(Continued)

FOREIGN PATENT DOCUMENTS
EP    0 540 759    5/1993
(Continued)

OTHER PUBLICATIONS

U.S. Appl. No. 10/832,375, filed Apr. 27, 2004, Yamada et al.
(Continued)

*Primary Examiner* — Georgia Y Epps
*Assistant Examiner* — Jennifer Bennett
(74) *Attorney, Agent, or Firm* — Oblon, Spivak, McClelland, Maier & Neustadt, L.L.P.

(57) ABSTRACT

A laser processing apparatus includes a laser source (11), a spatial phase modulator (13) configured to modulate a phase of a laser beam emitted from the laser source, a synthetic data generator (17) configured to generate synthetic data by combining hologram image data representing a pattern image to be processed with position displacement hologram data for shifting the pattern image to a prescribed position, the synthetic data being input to the spatial phase modulator for the phase modulation of the laser beams, and a focusing optical unit (14) configured to guide the phase-modulated laser beam onto a surface to be processed to reproduce the pattern image on the processed surface.

18 Claims, 11 Drawing Sheets

U.S. PATENT DOCUMENTS

| | | |
|---|---|---|
| 6,803,540 B2 | 10/2004 | Yamada et al. |
| 6,949,215 B2 | 9/2005 | Yamada et al. |
| 7,333,252 B2 * | 2/2008 | Brotherton-Ratcliffe et al. .................. 359/21 |
| 2003/0152756 A1 * | 8/2003 | Yamada et al. ............. 428/210 |
| 2004/0149705 A1 | 8/2004 | Yamada et al. |
| 2004/0179253 A1 * | 9/2004 | Hamano et al. ................ 359/9 |
| 2005/0018996 A1 | 1/2005 | Yamada et al. |

FOREIGN PATENT DOCUMENTS

| | | |
|---|---|---|
| JP | 8-118047 | 5/1996 |
| JP | 8-269764 | 10/1996 |
| JP | 9-10968 | 1/1997 |
| JP | 9-29465 | 2/1997 |
| JP | 10-319221 | 12/1998 |
| JP | 11-064614 | 3/1999 |
| JP | 2000-223766 | 8/2000 |
| JP | 2000-317662 | 11/2000 |
| JP | 2001-209003 | 8/2001 |
| JP | 2001-272635 | 10/2001 |
| JP | 2001-347669 | 12/2001 |
| JP | 2002-49002 | 2/2002 |
| JP | 2002-066769 | 3/2002 |
| JP | 2002-178171 | 6/2002 |
| JP | 2003-25085 | 1/2003 |
| JP | 2003-181678 | 7/2003 |
| JP | 2003-245784 | 9/2003 |
| JP | 2004-010310 | 1/2004 |
| JP | 2004-202498 | 7/2004 |

OTHER PUBLICATIONS

U.S. Appl. No. 12/047,437, filed Mar. 13, 2008, Kuramoto et al.

Yaroslavskii L.P. "Methods of Digital Holography" 1980, Plenum Publishing, New York, XP002448670 (the Whole Document).

Nobukazu Yoshikawa, et al. "Phase Optimization of a Kinoform by Simulated Annealing" Applied Optics, OSA, Optical Society of America, Washington DC, US, vol. 33, No. 5, Feb. 10, 1994, pp. 863-868, XP000429143.

* cited by examiner

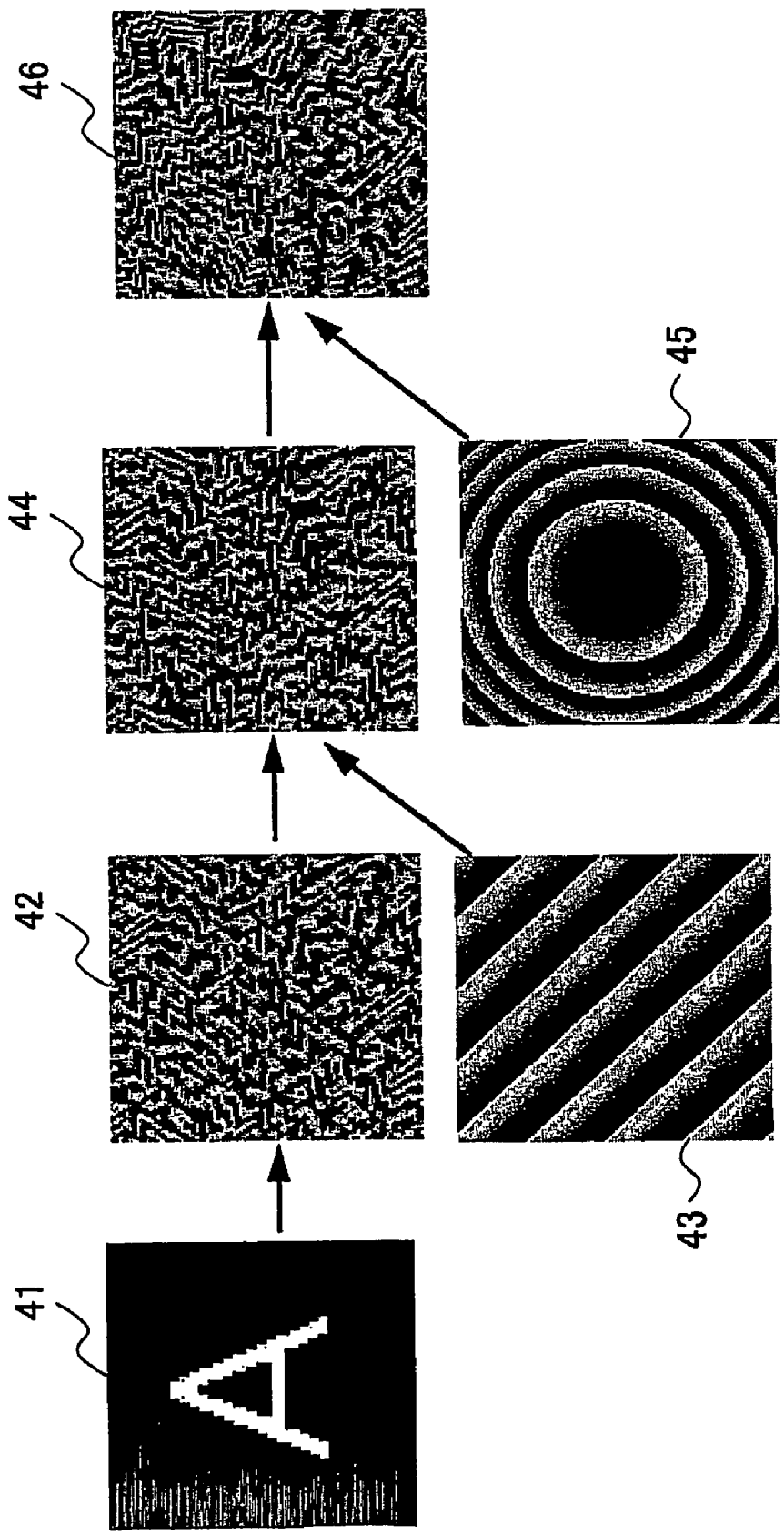

LASER PROCESSING APPARATUS USING DISTINCT HORIZONTAL AND VERTICAL DATA SETS

BACKGROUND OF THE INVENTION

The present invention generally relates to a laser processing apparatus for processing articles using a laser beam, and more particularly, to a laser processing technique applied to fabrication of high-precision components requiring a resolution of several microns to several hundred nanometers, as well as two-dimensional or three-dimensional shape-processed devices (such as micro-electric-mechanical systems (MEMS) devices or diffractive optics) and components with a number of fine holes, such as photonic crystals, printed boards, or inkjet heads.

Because a laser beam can converge accurately on a fine area in short time, it is used in various types of processing, including direct material processing and indirect processing making use of chemical change, reformation or alteration of the material. Direct processing includes surface patterning, drilling, ablation, and cutting of metals or synthetic resins. Examples of indirect processing include lithography and optical molding. Especially, in recent years and continuing, laser processing is often employed in superfine two-dimensional or three-dimensional shape processing to fabricate refractive and diffractive optical devices, master disks of optical disks, electric circuits, MEMS devices, etc.

Conventionally, there are several methods for performing shape processing using a laser beam, including:
(1) focusing the beam directly onto the object to be processed, while moving the focal point or the object (relative to each other); and
(2) guiding the beam through a mask to project the mask pattern onto the surface to be processed.

The first method (1) is grouped into two categories depending on which one of the object and the beam is moved, that is, moving the object to be processed in a direction perpendicular to the optical axis of the laser beams, or scanning the focal point using a galvano scanner. The method using the galvano scanner generally achieves faster and more precise processing; however, the throughput falls when surface processing or pattern processing over a wide area is performed.

The second method (2) allows collective processing of highly precise patterns by scaling down the mask pattern and projecting the downscaled pattern onto the surface to be processed. In addition, three-dimensional processing is possible using a gray scale mask. However, this method has the following problems:
(a) Since the light beam is blocked by a mask, light use efficiency becomes very low depending on the pattern to be projected; and
(b) Variation in light intensity guided to the mask leads to unevenness of the resultant shape of the processed products.

To solve these technical problems, it is proposed to use a diffraction optical device or a hologram to perform collective shape processing at high light use efficiency. See, for example, JP 2002-66769A and JP 2001-272635A.

With this method, the light beam emitted from a coherent source is shaped using a device for modulating the phase and/or the amplitude of the light beam in order to acquire a desired beam shape on the processing surface.

By the way, it is required for a laser processing apparatus to perform positioning of the beam onto a processed site. Especially when performing high-resolution shape processing, positioning accuracy at or below one tenth of the resolution is required.

Conventionally, various methods for positioning the focusing point of the laser beam onto a desired position have been proposed, for example, by using a closed-loop type stage with position detecting equipment or a piezo element, or using a high angular-resolution galvano scanner. The above-described JP 2002-66769 discloses a combination of the hologram device and a galvano scanner to achieve precise shape processing over a wide area.

However, such a laser processing apparatuses is expensive, and in addition, it causes vibration due to mechanical movement of the movable part or element.

Another problem is that when the processing position moves in the depth direction to process a three-dimensional shape or to form a hole, the focal point has to be controlled along the optical axis of the laser beam during the processing.

A conventional focal point control method employs an actuator using a piezo element as the driving source in the focusing optical system, or the stage on which a sample is fixed is driven.

With either method the apparatus become expensive because a highly precise driving mechanism is required, and in spite of the high-cost apparatus, the positioning accuracy is degraded due to vibration due to acceleration or slowdown.

Other prior art publications in the laser processing field are JP 2000-223766A and JP 2001-209003A. The former publication is directed to a laser processing apparatus in which the phase of the laser beam is modulated by modulation means structured by a liquid crystal panel so as to change the focal position or the beam shape. The latter publication is directed to a laser processing apparatus having a laser source, an optical system for collimating the laser beam emitted from the laser source into a parallel beam, and a spot shape transforming device for guiding the parallel beam onto the surface to be processed with a desired intensity distribution profile. The spot shape transforming device has functions of a lens and a spot shaper, and it controls the direction of the beam and redistributes the beam intensity so as to achieve a prescribed intensity distribution on the target surface. These two publications simply disclose known laser beam control techniques in the laser processing field, and further explanation is withheld.

SUMMARY OF THE INVENTION

The present invention was conceived in view of the above-described problems in the prior art, and an embodiment of the present provides a laser processing apparatus that can achieve high positioning accuracy and high light use efficiency without using an expensive positioning mechanism, while preventing degradation of positioning accuracy due to vibration of the mechanically moving parts.

In one aspect of the invention, a laser processing apparatus includes:
(a) a laser source;
(b) a spatial phase modulator configured to modulate a phase of a laser beam emitted from the laser source;
(c) a synthetic data generator configured to generate synthetic data by combining hologram image data representing a pattern image to be processed with position displacement hologram data for shifting the pattern image to a prescribed position, said synthetic data being input to the spatial phase modulator for the phase modulation of the laser beams; and (d) a focusing optical unit configured to guide the phase-modulated laser beam onto a surface to be processed to reproduce the pattern image on the processed surface.

By adding the position displacement hologram data to the hologram image data representing a prescribed pattern image, synthetic data containing position displacement information are produced. By modulating the phase of the laser beams using the synthetic hologram data, the pattern image is reproduced and processed at a desired position on the processed surface, while maintaining the light utilization efficiency high. The pattern image reproducing function and the positioning function are realized by a single spatial phase modulator.

BRIEF DESCRIPTION OF THE DRAWINGS

Other features and advantages of the present invention will become more apparent from the following detailed description when read in conjunction with the accompanying drawings, in which:

FIG. 5 illustrates still another example of computer-synthesized hologram data to be input to the spatial phase modulator;

FIG. 11A shows the first processing result and FIG. 11B shows the second processing result.

PREFERRED EMBODIMENTS OF THE INVENTION

The preferred embodiments of the present invention are described below with reference to the attached drawings.

FIRST EXAMPLE

Figure 1:
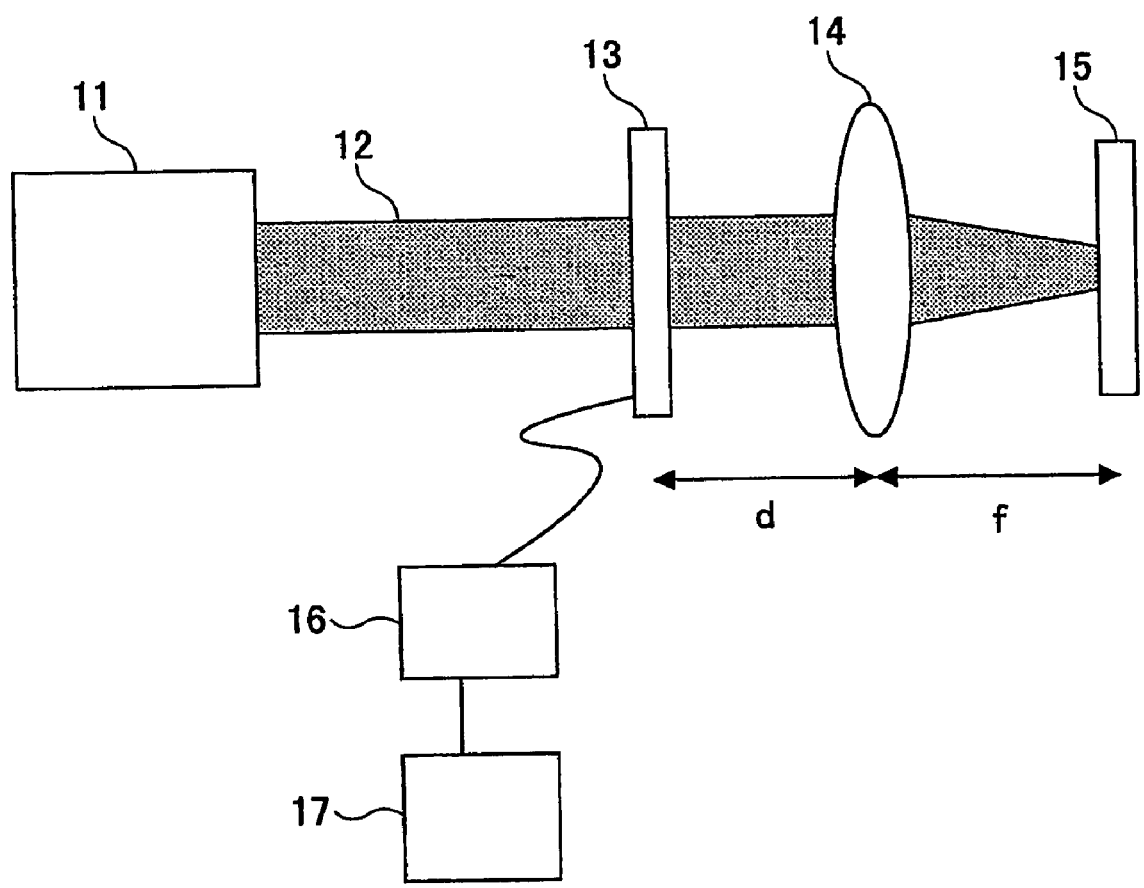
FIG. 1 is a schematic diagram illustrating a laser processing apparatus according to an embodiment of the present invention.
Figure 2:
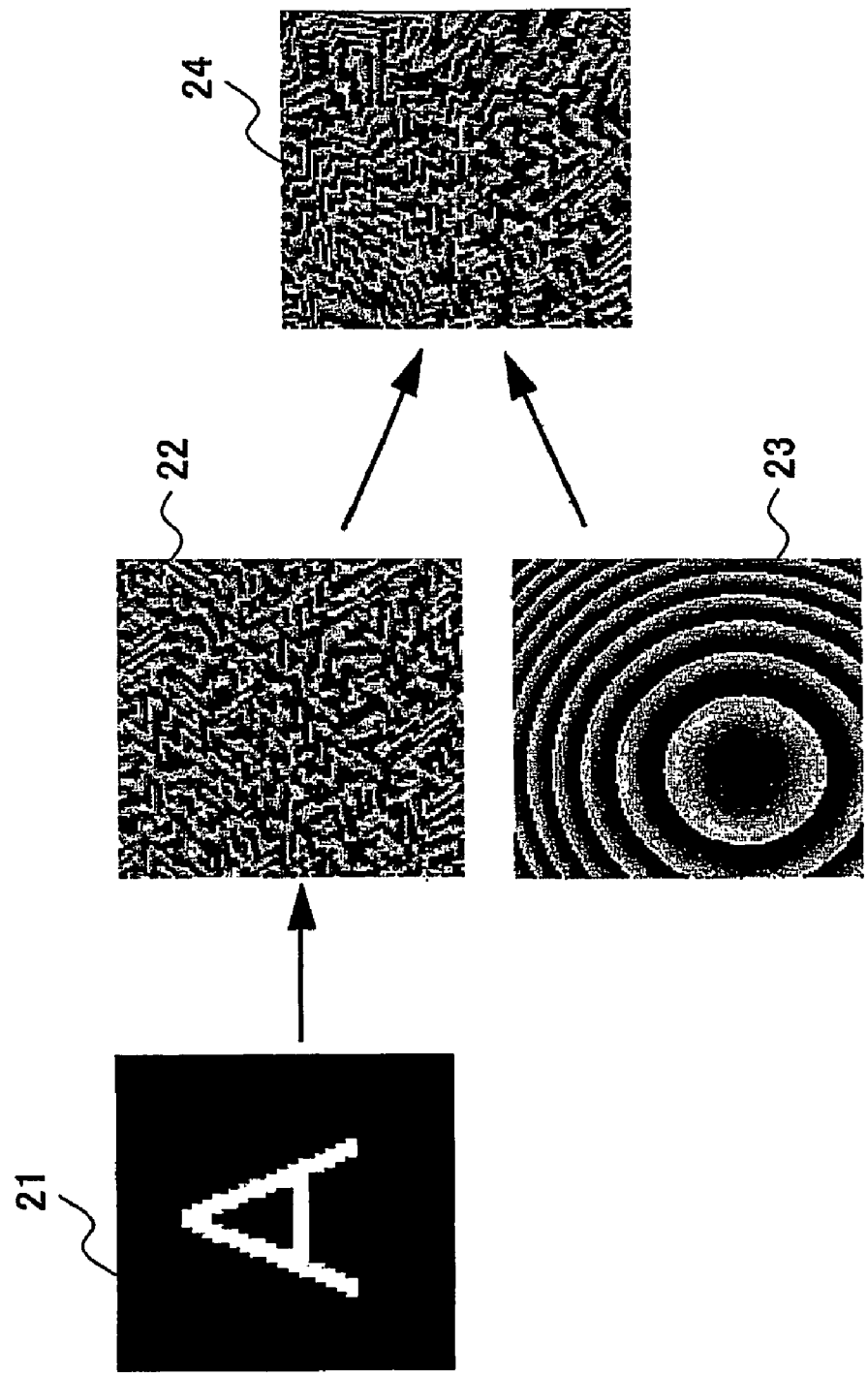
FIG. 2 illustrates an example of computer-synthesized hologram data to be input to a spatial phase modulator.

FIG. 1 is a schematic diagram of a laser processing apparatus of the first example according to an embodiment of the invention, and FIG. 2 illustrates an example of synthesis of a hologram image to be processed.

The laser processing apparatus includes a laser source 11, a spatial phase modulator 13, a focusing lens 14, a controller 16, and a computer 17. The laser beam 12 emitted from the laser source 11 is subjected to phase modulation at the spatial phase modulator 13, and guided by the focusing lens 14 onto the object 15 to be processed. The spatial phase modulator 13 is controlled by the controller 16. The computer 17 generates and supplies input data to the controller 16.

The laser source 11 is, for example, a second-harmonic 532 nm YAG laser. The focal length "f" of the focusing lens 14 is 10 mm, and the distance "d" from the spatial phase modulator 13 to the focusing lens 14 is 10 mm.

The spatial phase modulator 13 produces a phase difference making use of, for example, orientation of liquid crystal, an electric-optical effect, or a magneto-optical effect. Using the electro-optical effect or the magneto-optical effect is preferable because of fast response speed. The spatial phase modulator 13 may be of a reflective type or a transmission type. In this example, a transmission phase modulator 13 making use of an electro-optical effect is used; however, a reflective phase modulator may be used. The spatial phase modulator 13 has 512×512 pixels at pixel pitch of 30 µm and 256 gray scale levels in $2\pi$ phase modulation with respect to the laser beam.

FIG. 2 illustrates an example of data to be input to the spatial phase modulator 13. Image 21 defines a shape to be processed on the object 15. Computer-generated hologram image data 22 are computed by the computer 17 so as to reproduce the image 21. The computer-generated hologram image data 22 comprise 512×512 pixels defined by 256 gray scale levels, and the maximum of $2\pi$ phase modulation can be given to the computer-generated hologram image data.

To calculate the hologram, recursive Fourier transforms or simulated annealing may be employed. Such algorithms are disclosed in, for example, N, Yoshikawa and T. Yatagai, Appl. Opt. 33, 863-867 (1994), and J. Fienup, Opt. Eng. 19, 297-305 (1980).

Recursive Fourier transforms can calculate a hologram of a large number of pixels in a short time, as compared with simulated annealing.

The hologram image data 22 representing a pattern to be processed are combined with position displacement hologram data 23 to produce synthetic hologram data 24, which data are input to the spatial phase modulator 13. In this context, "combining" the data sets 22 and 23 is a process for adding the position displacement hologram data 23 to the hologram image 22 to give a computed phase modulation to each pixel. In this process, if the computed phase modulation exceeds the maximum (or allowable) phase modulation $2\pi$ at an arbitrary pixel, $2\pi$ is subtracted from the computed phase modulation and the residual is used as the input data.

The position displacement hologram data 23 are data for displacing the reproduced position of the hologram image, and they are also computed using the above-described suitable algorithm.

EXAMPLE 2

The position displacement hologram data 23 may be synthetic data defined by a combination of horizontally adjusting hologram data for controlling displacement in a direction parallel to the processed surface and vertically adjusting hologram data for controlling displacement in a direction perpendicular to the processed surface. With this arrangement, the position displacement hologram data set 23 is generated in a simpler manner. Again, "combining" the horizontal hologram data and the vertical hologram data is a process for adding these two data sets together, and if the resultant phase modulation exceeds 2π, the residual obtained by subtracting 2π from the added phase modulation is used as the input data. If phase modulation is required only in a direction perpendicular or parallel to the processed surface, the required data set is solely added.

EXAMPLE 3

Figure 3:
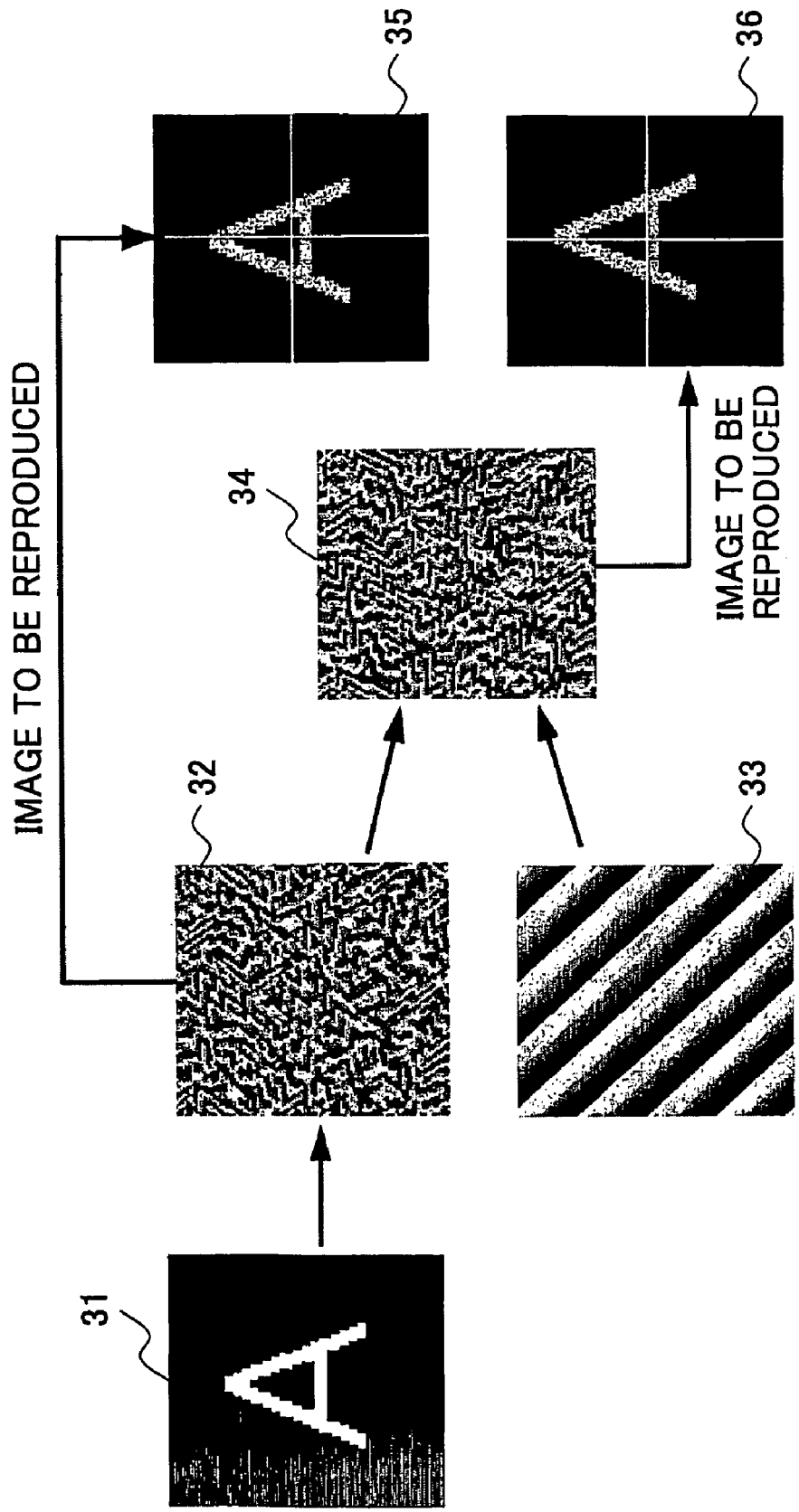
FIG. 3 illustrates another example of computer-synthesized hologram data to be input to the spatial phase modulator.
Figure 4A:
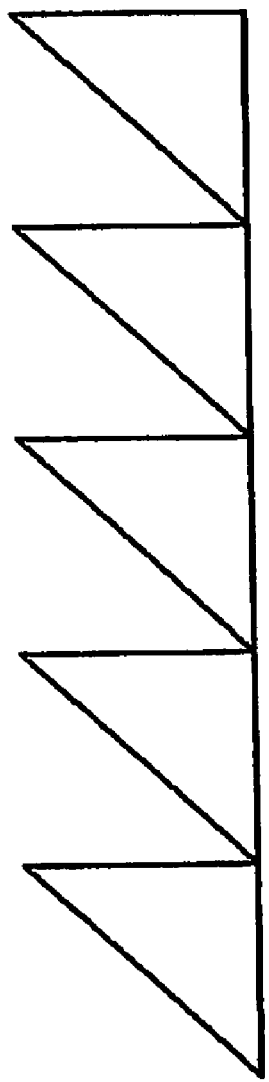
FIG. 4A through FIG. 4C illustrate examples of horizontal position displacement hologram data to be added to the hologram image data of the processed pattern to adjust the processing position within a plane parallel to the processed surface.
Figure 4B:
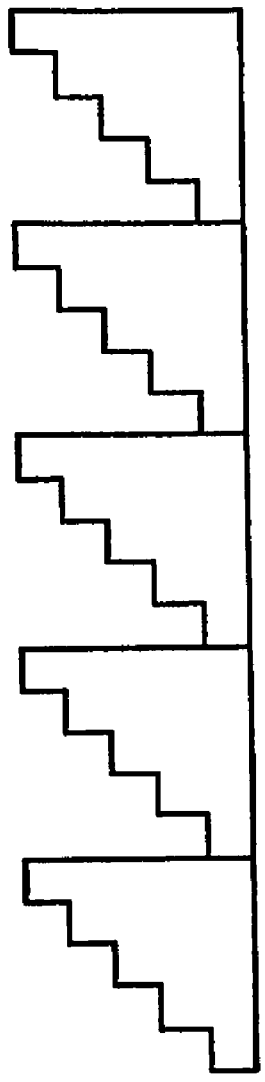
Figure 4C:
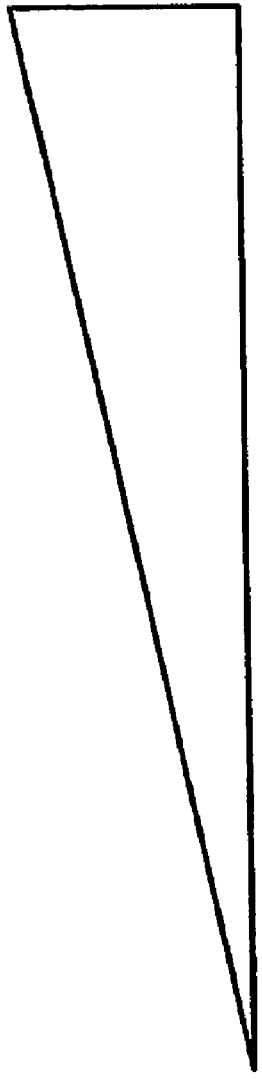

FIG. 3 illustrates another example of synthetic hologram data used in the laser processing apparatus according to an embodiment of the invention, and FIG. 4A through FIG. 4C show examples of position displacement hologram data 33 to be combined with the computer-synthetic hologram image data.

The synthetic-hologram data 34 produced in FIG. 3 are used in a laser processing apparatus shown in FIG. 1 to adjust the laser beam spot position only in a direction parallel to the processed surface. Based on the image 31 representing a shape to be processed, computer-synthesized hologram image data 32 are calculated so as to reproduce the image 31 on the processed surface. To shift the image reproducing position along the processed surface, horizontal position displacement hologram data set 33 having a sawtooth phase distribution profile in this example is added to the hologram image data 32. The resultant synthetic data 34 are input to the spatial phase modulator 13.

If the hologram image data 32 are solely input to the spatial phase modulator, without adding the position displacement hologram data 33, then a pattern image 35 is reproduced at a reference position on the processed surface. By adding the position displacement data set 33, the position for reproducing the pattern image is displaced and a reproduced image 36 is obtained. For the purpose of clarifying the position displacement, vertical and horizontal reference lines are depicted in the reproduced images 35 and 36.

For position displacement hologram data set 33, a suitable phase distribution profile is determined, such as a sawtooth data profile with asymmetric slopes illustrated in FIG. 4A. By combining the sawtooth data set with the computer-generated hologram image data 32 and by inputting the combined data (or the synthetic data) to the spatial phase modulator 13, the laser beam is tilted by angles θx and θy in the x and y directions, respectively, and the image reproducing spot is displaced along the processed surface corresponding to the tilting angles θx and θy. The tilting angles θx and θy are several milliradians, and paraxial approximation can be applied.

Detailed explanation is made of determination of the sawtooth data below. When the laser beam is tilted by the spatial phase modulator 13 by angles θx and θy in the x and y directions, displacements Δx and Δy in the x and y directions on the processed surface are expressed by $\Delta x = \tan\theta x * (2-f/d)$, and $\Delta y = \tan\theta y * (2-f/d)$, where f denotes the focal length of the focusing lens, and d denotes the distance from the spatial phase modulator 13 and the focusing lens 14 (see FIG. 1).

The phase modulation φ(x, y) at coordinates x and y in the spatial phase modulator is expressed by $$\phi(x, y) = 2\pi\left(x\frac{a_x}{\lambda}\tan\theta_x + y\frac{a_y}{\lambda}\tan\theta_y\right) - m \cdot 2\pi$$

$$= 2\pi\left(x\frac{a_x}{\lambda}\frac{\Delta x}{(2-f/d)} + y\frac{a_y}{\lambda}\frac{\Delta y}{(2-f/d)}\right) - m \cdot 2\pi$$

where $a_x$ and $a_y$ are pixel pitches of the spatial phase modulator in the x and y directions, respectively, and "m" is an integer multiplied so as to maintain φ(x, y) within the range from 0 to 2π.

The positioning accuracy using the position displacement data (sawtooth data, for example) is explained below. The minimum inclination of wavefront given by the sawtooth data is expressed by λ×(8/M)/Na where λ is the wavelength of the laser beam, M is the modulation level, N is the number of pixels, and a is the pixel pitch. In this example, there are eight modulation levels to define minimum inclination of wavefront. Setting eight modulation levels is supposed to be sufficient because the theoretical diffraction efficiency of 98% can be achieved.

Under these conditions, the minimum inclination of wavefront is about 1.9 microradians, which value is regarded as the minimum resolution. As compared with typical positioning accuracy of a galvano scanner ranging from 5 microradians to 10 microradians, higher positioning accuracy at higher resolution can be achieve in this embodiment without using mechanical components. The corresponding laser beam positioning accuracy on the processed surface is about 20 nm. This accuracy is defined by the performance of the spatial phase modulator 13, and if the number of pixels or the number of modulation levels is increased, still more accurate positioning can be performed.

The horizontal position displacement data set 32 is not limited to the sawtooth data shown in FIG. 4A, and other suitable phase distribution profiles, such as a stepwise or quantized data profile shown in FIG. 4B, or a simply sloped data profile shown in FIG. 4C may be employed. In addition, the slope of the data profile is not limited to a straight line, but a slightly curved profile is also acceptable.

EXAMPLE 4

FIG. 5 is a schematic diagram illustrating still another example of synthetic hologram data used in a laser processing apparatus. In this example, synthetic hologram data 44 contain not only horizontal position displacement information in a direction parallel to the processed surface, but also vertical position displacement information in a direction perpendicular to the processed surface. Such synthetic hologram data can be used in the laser processing apparatus shown in FIG. 1.

In addition to the horizontal position displacement data (sawtooth data in this example) 43, vertical position displacement data 45 with a phase distribution similar to a Fresnel zone plate are added to the computer generated hologram image data. With this arrangement, synthetic hologram data set 46 horizontally and vertically modulated is input to the spatial phase modulator 13.

To be more precise, computer-generated hologram image data 42 are calculated based on the pattern image 41 so as to reproduce the pattern image on the processed surface. The sawtooth data 43, which are the horizontal position displacement data used to displace the beam spot within a plane of the processed surface, are added to the computer-generated hologram image data 42, and horizontally modulated synthetic data 44 are produced. Then, the Fresnel zone plate data 45, which are vertical position displacement data used to displace the beam spot in a direction perpendicular to the processed surface, are further added to the horizontally modulated synthetic data 44. Consequently, horizontally and vertically modulated synthetic data set 46 is obtained. If the final modulation amount exceeds $2\pi$, then an integer multiple of $2\pi$ is subtracted from the modulated data set 46 to produce input data to the spatial phase modulator 13.

The vertical position displacement data 45 with the Fresnel zone plate like phase distribution have a function similar to a Fresnel lens, and they can add a desired radius R of curvature to the wavefront of the laser beam. The Fresnel zone plate data 44 are not necessarily perfectly continuous data, but may be quantized slightly modified so as to reduce the data amount.

EXAMPLE 5

When using the horizontally and vertically modulated hologram data (synthetic hologram data) 46 shown in FIG. 5, the laser processing apparatus is configured to maintain the image size reproduced on the processed surface constant regardless of the focal length of the added Fresnel zone plate data 45. For this reason, the distance "d" from the spatial phase modulator 13 to the focusing lens 14 is set equal to the focal length "f" of the focusing lens 14.

In this example, a single lens 14 is used as the focusing lens system; however, a combination of multiple lenses may be employed as the focusing lens system. In that case, the lens processing apparatus is configured such that the composite focal length "f" of the focusing lens system becomes equal to the distance from the spatial phase modulator 13 to the combined principal plane of the focusing lens system.

If a lens with focal length f1 and a lens with focal length f2 are positioned at distance "d", the composite focal length f' of the combined lens system is given by $$\frac{1}{f'} = \frac{1}{f1} + \frac{1}{f2} - \frac{d}{f1 f2}$$

Accordingly, if d=f2, then the composite focal length f' becomes f2 (a constant value) regardless of the value of f1.

If the focal length of the Fresnel zone plate data 45 to be input to the spatial phase modulator 13 is f1, and if the focal length of the focusing lens system is f2, then, the composite focal length becomes constant at f2 by setting the distance from the spatial phase modulator 13 to the focusing lens system to f2. Accordingly, the image size of the pattern reproduced on the processed surface becomes constant regardless of the focal length of the Fresnel zone plate data 45.

In this condition, the displacement $\Delta z$ of the focal position is expressed by $$\Delta z = f^2 / R$$

where f is a focal length of the focusing lens system, and R is a radius of curvature given to the wavefront of the laser beam by the Fresnel zone plate data 45.

On the other hand, the phase modulation $\phi(x, y)$ at coordinates x and y of the spatial phase modulator 13 is expressed as $$\phi(x, y) = \left(R - \sqrt{R^2 - (a_x^2 x^2 + a_y^2 y^2)}\right) - m \cdot 2\pi$$
$$= \left(f^2/\Delta z - \sqrt{f^2/\Delta z - (a_x^2 x^2 + a_y^2 y^2)}\right) - m \cdot 2\pi$$

where $a_x$ and $a_y$ are pixel pitches of the spatial phase modulator in the x and y directions, respectively, and m is an integer multiplied so as to maintain $\phi(x, y)$ within the range from 0 to $2\pi$.

EXAMPLE 6

Figure 6:
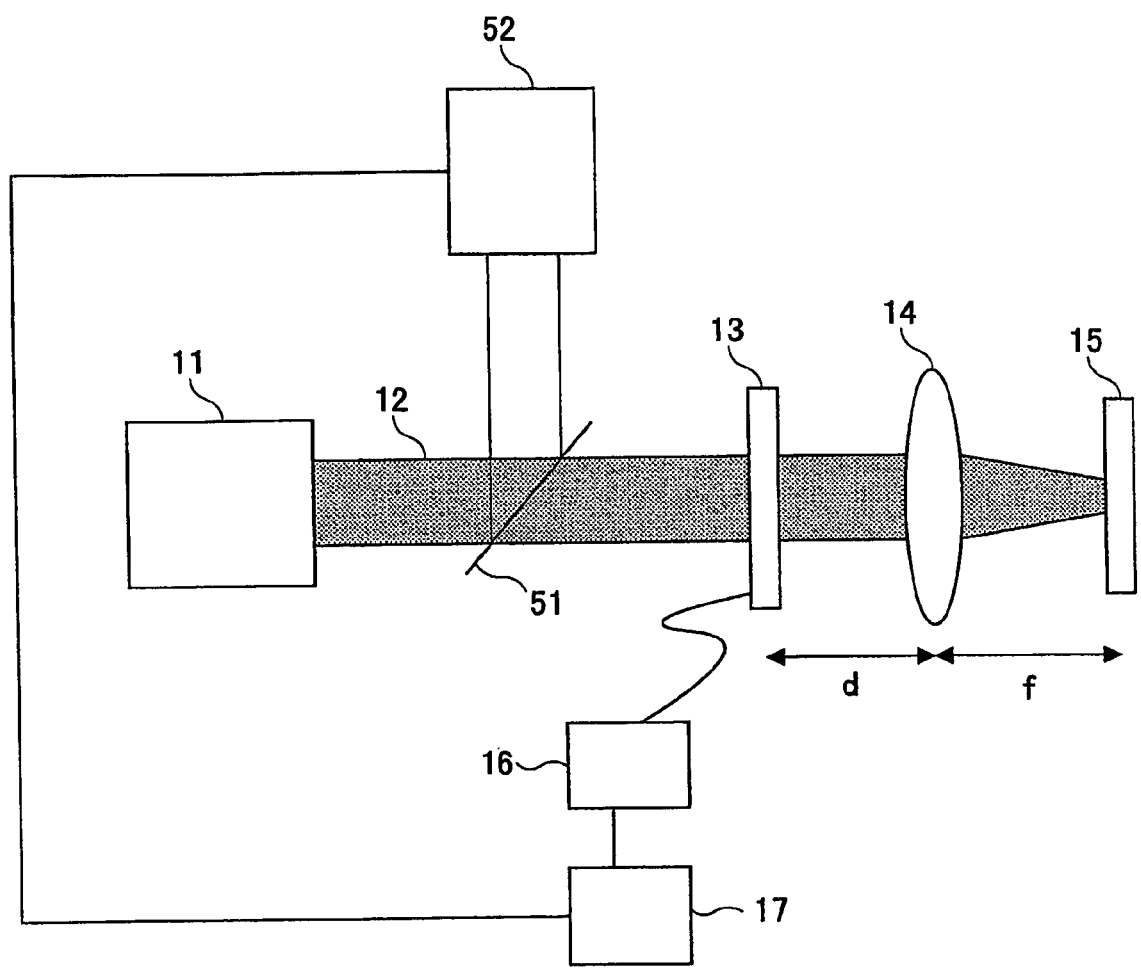
FIG. 6 is a schematic diagram illustrating a modification of the laser processing apparatus according to an embodiment of the invention.

FIG. 6 is a schematic diagram illustrating a modification of the laser processing apparatus according to an embodiment of the invention. The laser processing apparatus is furnished with a wavefront measuring device 52 for the purpose of preventing adverse effect on the processing accuracy due to distortion of the wavefront of the laser beam. A beam sampler 51 is inserted between the laser source 11 and the spatial phase modulator 13 to guide a portion of the laser beam toward the wavefront measuring device 52. The same elements as those shown in FIG. 1 are denoted by the same numerical symbols and explanation for them is omitted.

A portion of the laser beam emitted from the laser source 11 is extracted by the beam sampler 51, and is incident on the wavefront measuring device 52. The wavefront measuring device 52 is, for example, of a Shack Hartmann type using a microlens array, or of a type splitting the beams to cause interference for measurement of the wavefront.

The signal output from the wavefront measuring device 52 is input to the computer 17. The computer supplies data for correcting the distortion of the wavefront to the spatial phase modulator 13 to correct the distortion of the wavefront of the laser beam.

EXAMPLE 7

Figure 7:
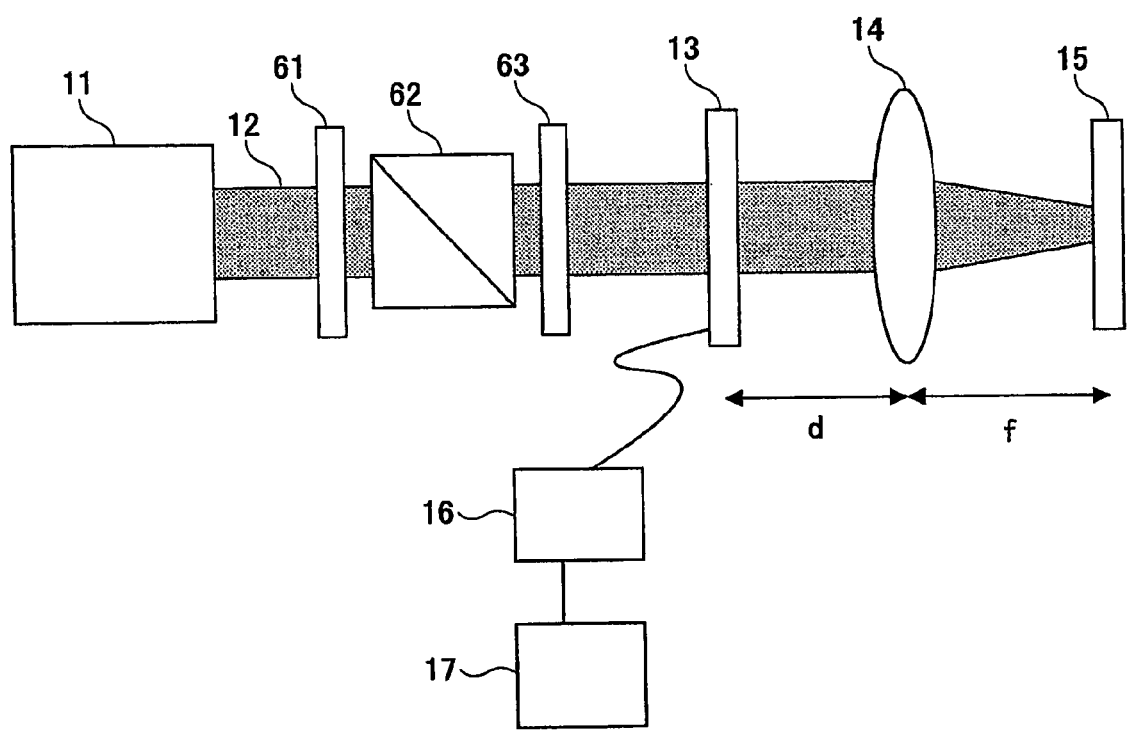
FIG. 7 is a schematic diagram illustrating another modification of the laser processing apparatus according to an embodiment of the invention.

FIG. 7 is a schematic diagram illustrating another modification of the laser processing apparatus according to an embodiment of the invention. In this modification, the laser processing apparatus is furnished with an intensity and/or irradiation time adjusting structure.

The laser processing apparatus shown in this example is configured to accurately control processing depth and three-dimensional processing shapes by regulating the intensity and the irradiation time of the laser beam. To be more precise, a half (½) wave plate 61, a Glan-Thompson prism 62, and a shutter 63 are inserted between the laser source 11 and the spatial phase modulator 13. The elements the same as those shown in FIG. 1 and FIG. 6 are denoted by the same numerical symbols, and explanation for them is omitted.

The laser beam emitted from the laser source 11 passes through the half wave plate 61, the Glan-Thompson prism 62, and the shutter 63, and is incident on the spatial phase modulator 13. Since in general the laser beam emitted from the laser source 11 is a linearly polarized beam, the intensity of the laser beam passing through the Glan-Thompson prism 62 can be regulated by adjusting the angle of the half wave plate 61. When the linear polarization of the laser beams is not so strong, two Gran-Thompson prisms may be arranged. In this case, the laser beam intensity can be adjusted by rotating the direction of one of the Gran-Thompson prisms.

The laser beam irradiation time (or the number of laser pulses) is adjusted by the shutter 63. The shutter 63 may be mechanically operated, or alternatively, it may employ an acoustic optical device or an electrooptical device. In the example shown in FIG. 7, both the intensity modulating device and the irradiation time (or laser pulse number) control device are provided; however, it is possible to use only one of them in the laser processing apparatus.

EXAMPLE 8

Figure 8:
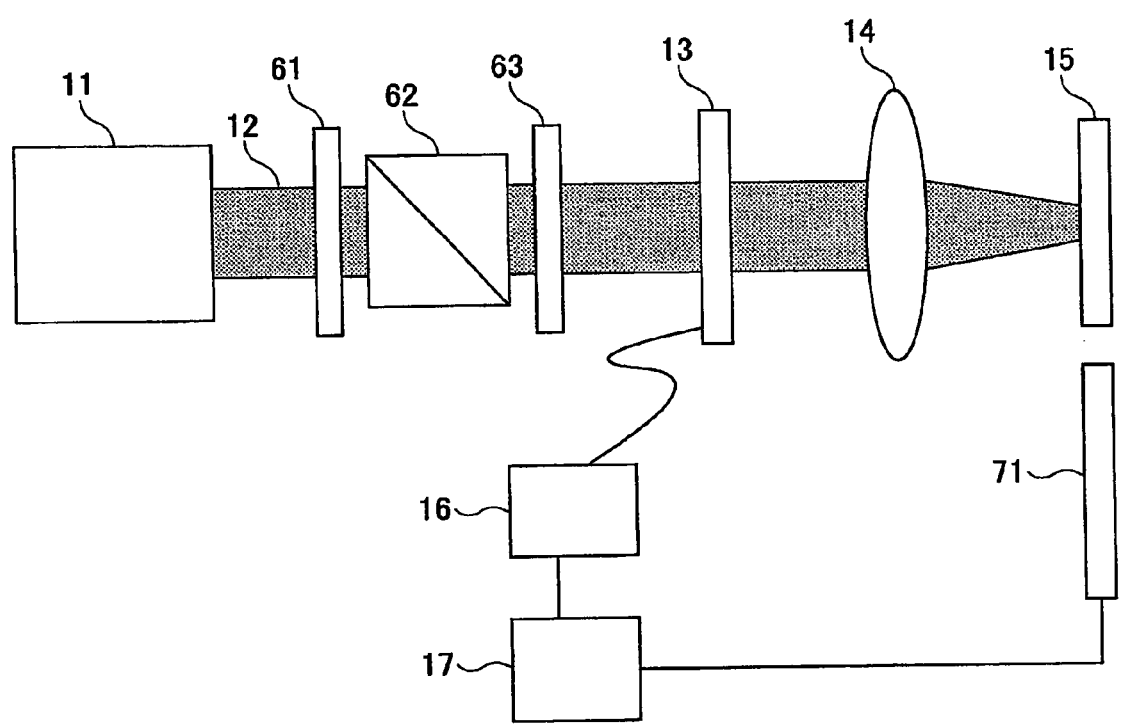
FIG. 8 is a schematic diagram illustrating still another modification of the laser processing apparatus according to an embodiment of the invention.

FIG. 8 is still another modification of the laser processing apparatus according to an embodiment of the invention. In this modification, the laser processing apparatus is furnished with an end-measuring device 71 to measure the position of the object to be processed, in addition to the beam intensity/irradiation time adjusting mechanism shown in FIG. 7.

The laser processing apparatus shown in FIG. 8 is configured to perform precise processing at a desired position along the surface of the object by measuring the position of the object being processed from two directions. The components the same as those shown in FIG. 1, FIG. 6 and FIG. 7 are denoted by the same numerical symbols and explanation for them is omitted.

A pair of end-measuring laser devices 71 are attached to, for example, the stage (not shown) for holding the object 15 in two directions with respect to the object 15, within a plane perpendicular to the laser beam, to measure the position of the object 15. The signals from the end-measuring device 71 are fed back to the computer 17.

EXAMPLE 9

Figure 9:
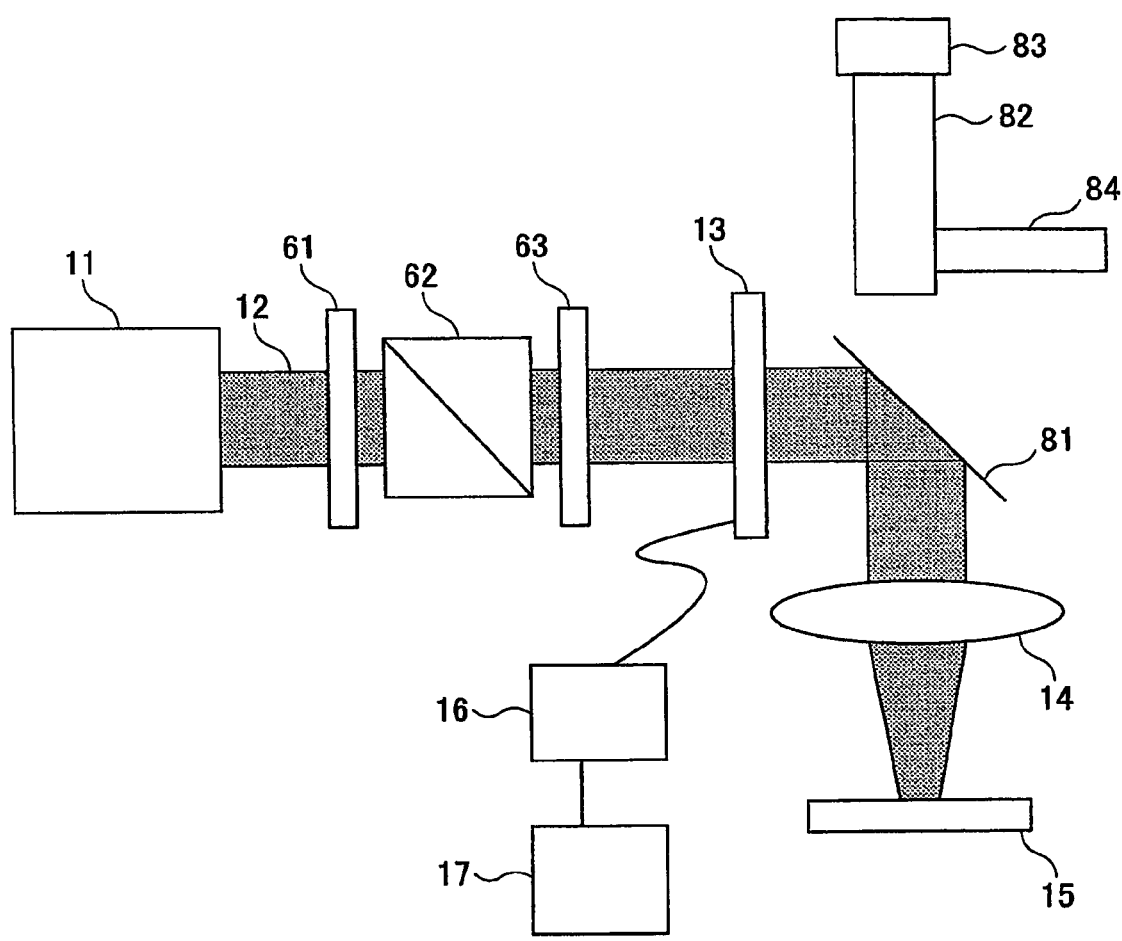
FIG. 9 is a schematic diagram illustrating yet another modification of the laser processing apparatus according to an embodiment of the invention.

FIG. 9 is a schematic diagram illustrating still another modification of the laser processing apparatus. The laser processing apparatus of this modification is furnished with an observation mechanism.

The laser processing apparatus shown in FIG. 9 is configured to achieve higher positioning accuracy by monitoring the position to be processed. A dichroic mirror 81 is inserted between the spatial phase modulator 13 and the focusing lens 14. In addition, a microscope lens barrel 82, a CCD camera 83, and a lamp 84 are provided. The components the same those shown in the previous examples are denoted by the same numerical symbols and explanation for them is omitted.

Because the dichroic mirror 81 for reflecting only the laser beam is placed before the focusing lens 14, the processing position can be observed by the microscope lens barrel 82 and the CCD camera 83 through the diachronic mirror 81 and the focusing lens 14. It is desired that the processing position is illuminated by the lamp 84. The image captured by the CCD camera 83 is input to the computer 17. The computer 17 reads features on the processed surface to specify the irradiating position of the laser beam. This information is reflected in generation of position displacement data.

The features on the processed surface include alignment marks provided in advance and edges of the object 15. If the laser processing is applied to direct shaping, the processed shape achieved so far can also be used as the feature on the processed surface.

During the observation, the laser beam may be switched off, or alternatively, the intensity may be reduced below the processing threshold. In the latter case, the laser beam spot position can also be observed by the CCD camera 83, and the positional relation between the laser spot and the alignment mark is fed back to the computer 17 so as to achieve further precise positioning.

EXAMPLE 10

Figure 10:
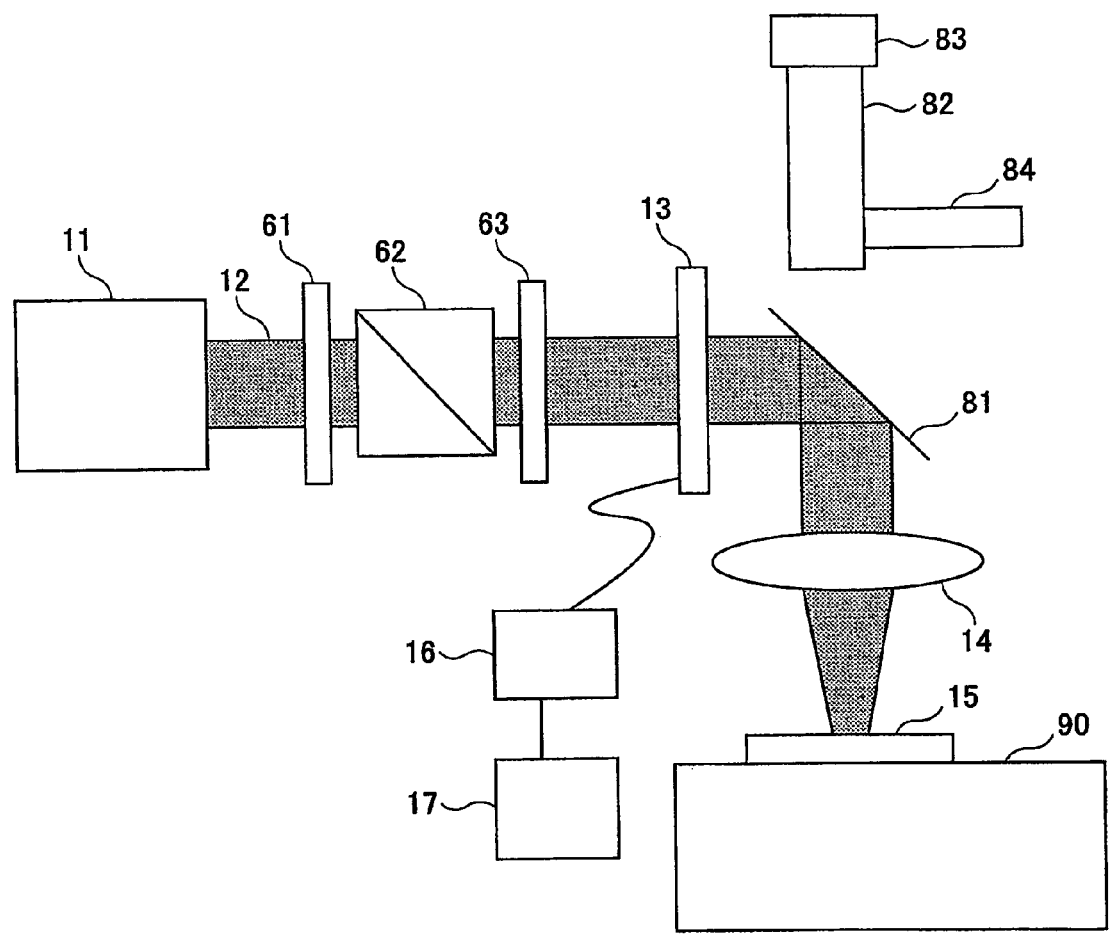
FIG. 10 is a schematic diagram illustrating yet another modification of the laser processing apparatus according to an embodiment of the invention.
Figures 11A, 11B:
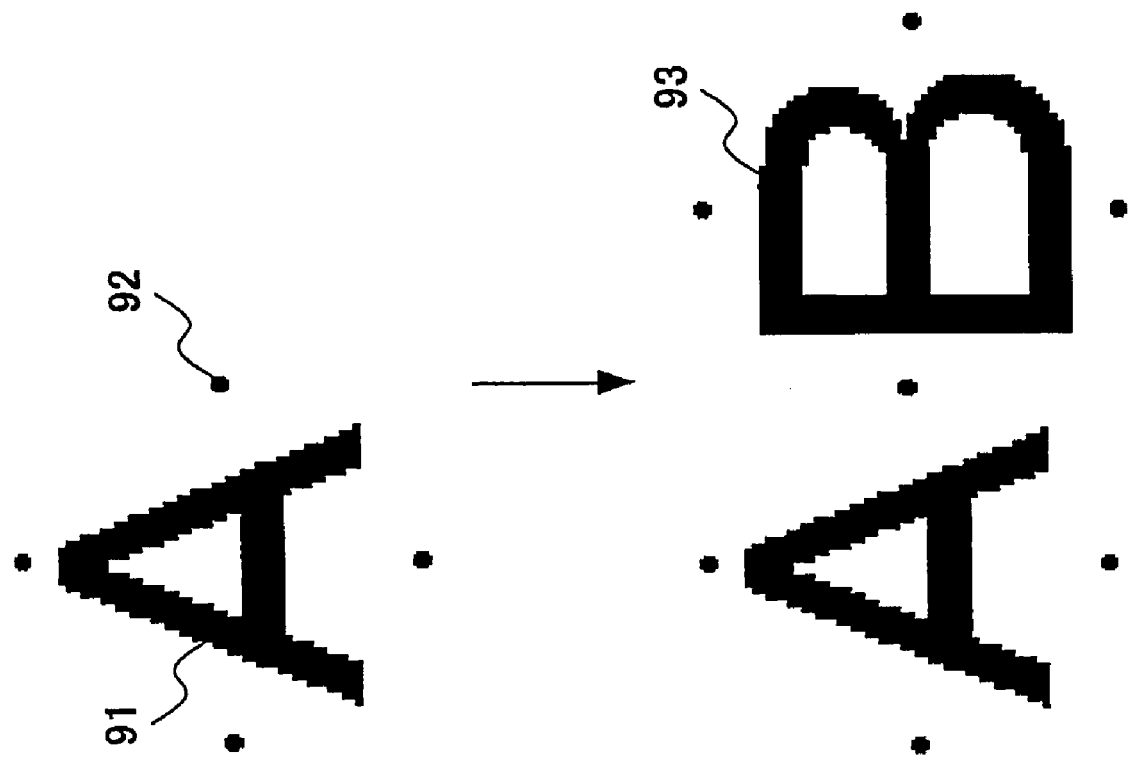
FIG. 11A and FIG. 11B are diagrams for explaining step-and-repeat processing, where

FIG. 10 is a schematic diagram illustrating yet another modification of the laser processing apparatus according to an embodiment of the invention. The laser processing apparatus further includes a stage 90 for moving the object 15, in addition to the structure shown in FIG. 9. FIG. 11A and FIG. 11B are schematic diagrams for explaining step-and-repeat processing using the laser processing apparatus shown in FIG. 10.

This laser processing apparatus is configured to achieve fine processing over a wide area, while maintaining the positioning accuracy sufficiently high. The components the same as those shown in the previous examples are denoted by the same numerical symbols and explanation for them is omitted.

The object to be processed is fixed on a biaxial stage 90 movable in a plane perpendicular to the irradiation of the laser beams. The biaxial stage 90 is an inexpensive automatic stage with repeat-positioning accuracy at or above several hundred microns. The output from the CCD camera 83 is supplied to the computer 17, and the information about the processing position is reflected in the hologram data input to the spatial phase modulator 13.

When performing step-and-repeat processing, a pattern 91 is formed at the first processing, as illustrated in FIG. 11A. During the first processing, alignment marks 92 are also formed. The alignment marks 92 are used for alignment of the second and the subsequent processing. Then, the stage 90 is driven and alignment is performed for the second processing, using the method described in the previous example in conjunction with FIG. 9. Then, the second processing is performed to form pattern 93, as illustrated in FIG. 11B. Again, alignment marks are formed together with the pattern 93.

EXAMPLE 11

Although not illustrated in figures, explanation is made of several more modifications. In a further modification, measuring equipment for measuring the distance between the focusing lens 14 and the object 15 may be further provided in the laser processing apparatus (any one of the apparatuses shown in FIG. 1, and FIG. 6 through FIG. 10) to precisely control the hologram image reproducing position along the optical axis of the laser beam. The measuring equipment makes use of astigmatism, triangulation, or other suitable measuring methods. The signals from the measuring equipment are fed back to the computer 17 to generate hologram data containing displacement information in a direction perpendicular to the processed surface.

EXAMPLE 12

In another modification, the laser processing apparatus may be configured so as to greatly shift the focal position by providing a stage for holding the object 15 and the stage being driven along the optical axis of the laser beam to the structure shown in FIG. 1, and FIG. 6 through FIG. 10).

By driving the stage along the optical axis of the laser beams, the distance between the focusing lens 14 and the object 15 can be changed greatly to shift the focal position perpendicular to the processed surface. This arrangement is suitable for processing an object with bumps or steps or forming grooves or holes.

EXAMPLE 13

The laser processing apparatus may be configured to reduce influence of thermal propagation of the laser beam. In the laser processing apparatuses shown in FIG. 1 and FIG. 6 though FIG. 10, the laser source 11 may be replaced with a ultra-short pulse laser with a pulse width of several picoseconds or less. An example of the ultra-short pulse laser is a titanium sapphire laser with a pulse width of 100 femtoseconds.

In direct processing, the surface shape of the object being processed is directly changed by heat of the laser beam. The energy of the laser beam propagates as heat to the irradiated position, and the irradiated portion is vaporized or liquefied causing the shape to be changed. During the irradiation, the influence of heat propagation extends to the surrounding of the irradiated position, which makes it difficult to perform precise patterning. Especially in fine processing, the influence of heat propagation cannot be neglected.

Using an ultra-short pulse laser with a pulse width at or below several picoseconds, mutual interaction between the laser beam and the object being processed is very short, and influence of heat propagation can be prevented.

Because high energy is instantaneously generated by an ultra-short pulse laser, energy efficiency is superior and materials hard to process, such as diamond, glass, or oxides, can be directly etched.

In addition, an ultra-short pulse laser has a high peak level, and laser processing making use of two-photon absorption can be performed. This means that laser processing is carried out inside an object transparent with respect to the laser beam. Since the laser processing apparatus of the above-described examples is capable of three-dimensional positioning, laser processing can be carried out at a desired position inside the transparent object at high positioning accuracy.

As has been described above, any one of the horizontal hologram data set representing displacement in a direction parallel to the processed surface, the vertical hologram data set representing displacement in a direction perpendicular to the processed surface, and the combination of the horizontal and vertical hologram data sets can be used as the position displacement data.

Since the horizontal hologram data and the vertical hologram data are calculated separately and combined if necessary to generate the position displacement data, calculation time for producing the position displacement data is reduced and the processing rate can be improved.

By employing a sawtooth phase distribution for the horizontal hologram data set, the displacement hologram data representing desired displacement in a direction parallel to the processed surface can be produced in a simple manner. Based on the displacements $\Delta x$ and $\Delta y$ of the current laser beam spot from the prescribed position, the sawtooth profile can be automatically determined by simple calculation.

When processing a complicated pattern, the pattern may be divided into simple sub-patterns. In this case, the laser processing is repeatedly performed for each of the divided sub-patterns, while changing the hologram image data and the sawtooth displacement data. Although computational error becomes inevitably large in the calculation of a hologram image of a complicated pattern, reproduction error due to computation of the hologram image can be reduced by dividing the pattern into simple sub-patterns, Similarly, the vertical hologram data set having a phase distribution profile similar to a Fresnel zone plate can also be calculated in a simple manner. Using the Fresnel zone plate hologram data, the laser irradiating position can be adjusted in a direction perpendicular to the processed plane (along the optical axis of the laser beam).

By setting the distance "d" from the spatial phase modulator to the focusing optical unit equal to the focal length "f" of the focusing optical unit, the size of the reproduced hologram image can be maintained constant regardless of the focal length of the position displacement data with the Fresnel zone plate phase distribution. When reproducing the hologram image on the processed surface using the Fresnel zone plate position displacement data, the size of the reproduced hologram image generally changes according to the focal length of the added Fresnel zone plate data because the size of reproduced pattern image is determined by the focal length of the Fresnel zone plate data, the focal length of the focusing lens, and the positional relation between the spatial phase modulator and the focusing lens. The above-described arrangement overcomes this problem.

By providing a wavefront measuring unit to measure a wavefront of the beam, and by feeding the measurement result to the computer, information about correcting the distortion of the wavefront can be reflected in the synthetic hologram data to be input to the spatial phase modulator. Consequently, adverse influence due to wavefront distortion can be prevented.

By further providing at least one of the irradiation time adjusting unit configured to regulate irradiation time of the laser beam and the beam intensity adjusting unit configured to regulate intensity of the laser beam, the optimum intensity and/or irradiation time can be set. Since the processing depth and shape depend on the laser beam intensity and irradiation time (or the number of pulses), using the optimum intensity and irradiation time leads to high processing accuracy in the shape of the pattern. If hologram images are generated by dividing a complicated pattern into several sub-patterns, the laser irradiation time may be changed for each of the sub-patterns to achieve accurate reproduction of a three-dimensional shape.

When the laser processing apparatus is furnished with a horizontal-direction position detector for detecting a horizontal position in a plane parallel to the processed surface, horizontal hologram data used to displace the pattern in a direction parallel to the processed surface can be generated accurately based on the detected position. Consequently, horizontal hologram data with, for example, an appropriate sawtooth phase distribution profile can be automatically determined.

By configuring the horizontal-direction position detector to detect a reference pattern formed on the processed surface, the target position to be processed can be fed back to the computer to perform accurate positioning. When direct shape-processing is performed, the surface observation result can be supplied to the computer during the processing, and the laser irradiating position and intensity can be regulated in real time.

When a first driving unit for moving the light spot of the laser beam relative to the processed surface in a direction parallel to the processed surface is used to perform so-called step-and-repeat processing, accurate processing can be performed over a wide area. In this case, rough adjustment is carried out by the first driving unit, and fine adjustment is implemented by the synthetic hologram data input to the spatial phase modulator. Accordingly, the first driving unit may be an inexpensive one with positioning accuracy at or above 10 µm.

When the laser processing apparatus is furnished with a vertical-direction position detector for detecting a relative positional relation between the focusing lens and the processed surface, vertical hologram data used to displace the pattern in a direction perpendicular to the processed surface can be generated accurately based on the positional relation.

To reproduce a hologram image at a correct position in a direction perpendicular to the processed surface, the distance between the focusing lens and the processed surface is important. In step-and-repeat processing, the distance from the focusing lens to the processed surface may vary due to unevenness of the surface. Therefore, by supplying the measured distance to the computer, the hologram image reproducing position can be precisely adjusted along the optical axis of the laser beam.

By providing a second driving unit for moving the light spot of the laser beam relative to the processed surface in a direction perpendicular to the processed surface, a three-dimensional shape with conspicuous steps or deep grooves can be processed. With the synthetic hologram data containing vertical displacement information, the focal position can be adjusted up to several tens of microns in a direction perpendicular to the processed surface. To reproduce a three-dimensional pattern with a step or a groove exceeding this level, the distance between the focusing lens and the processed surface can be changed greatly by the second driving unit.

By using an ultra-short pulse laser as the laser source, adverse influence due to heat propagation can be reduced because the interaction time between the laser beam and the processed surface is very short. Consequently, a precise outline of the pattern can be reproduced, preventing the influence of heat propagation from expanding to the surrounding area. In addition, with instantaneously generated high energy, direct processing can be performed on a material hard to process.

The invention claimed is:

1. A laser processing apparatus, comprising:
    a laser source;
    a spatial phase modulator configured to modulate a phase of a laser beam emitted from the laser source;
    a focusing optical unit configured to guide the phase-modulated laser beam onto a surface to be processed to reproduce a pattern image on the processed surface;
    a computer configured to calculate separately a horizontal hologram data set representing displacement of the pattern image in a direction parallel to the processed surface and a vertical hologram data set representing displacement of the pattern image in a direction perpendicular to the processed surface, the horizontal hologram data set and the vertical hologram data set being distinct from each other; and
    a synthetic data generator configured to generate synthetic data by combining hologram image data representing the pattern image to be processed with position displacement hologram data for shifting the pattern image to a prescribed position, said position displacement hologram data including either the horizontal hologram data set, the vertical hologram data set, or a combination of the horizontal and vertical hologram data sets, said synthetic data being input to the spatial phase modulator for the phase modulation of the laser beams.

2. The laser processing apparatus of claim 1, wherein the horizontal hologram data set has substantially a sawtooth phase distribution profile.

3. The laser processing apparatus of claim 1, wherein the vertical hologram data set has a phase distribution profile similar to a Fresnel zone plate.

4. The laser processing apparatus of claim 3, wherein a distance from the spatial phase modulator to the focusing optical unit is equal to a focal length of the focusing optical unit.

5. The laser processing apparatus of claim 1, further comprising:
    a wavefront measuring unit configured to measure a wavefront of the laser beam input to the spatial phase generator,
    wherein the synthetic data generator generates correction data for correcting distortion of the wavefront of the laser beam detected by the wavefront measuring unit, and the correction data are supplied to the spatial phase modulator.

6. The laser processing apparatus of claim 1, further comprising at least one of:
    an irradiation time adjusting unit configured to regulate irradiation time of the laser beam; and
    a beam intensity adjusting unit configured to regulate an intensity of the laser beam.

7. The laser processing apparatus of claim 1, further comprising:
    a horizontal-direction position detector configured to detect a horizontal position in a plane parallel to the processed surface,
    wherein the synthetic data generator generates the horizontal hologram data set based on the detection result.

8. The laser processing apparatus of claim 7, wherein the horizontal-direction position detector detects a reference pattern formed on the processed surface.

9. The laser processing apparatus of claim 1, further comprising:
    a first driving unit configured to move a light spot of the laser beam relative to the processed surface in a direction parallel to the processed surface.

10. The laser processing apparatus of claim 1, further comprising:
    a vertical-direction position detector configured to detect a positional relation between the focusing optical unit and the processed surface in a direction perpendicular to the processed surface,
    wherein the synthetic data generator generates the vertical hologram data set based on the detection result.

11. The laser processing apparatus of claim 1, further comprising:
    a second driving unit configured to move a position of the processed surface relative to the focusing optical unit in a direction perpendicular to the processed surface.

12. The laser processing apparatus of claim 1, wherein the laser source is an ultra-short pulse laser source with a pulse width at or below several picoseconds.

13. A laser processing method, comprising:
    calculating hologram image data representing a pattern image to be processed on a object;
    generating position displacement data for shifting the pattern image to a prescribed position with respect to a processed surface of the object;
    combining the hologram image data with the position displacement data to produce synthetic hologram data;
    modulating a phase of a laser beam using the synthetic hologram data; and
    guiding the phase-modulated laser beam onto the processed surface using an optical system,
    wherein said position displacement data includes either a horizontal hologram data set representing displacement in a direction parallel to the processed surface, a vertical hologram data set representing displacement in a direction perpendicular to the processed surface, or a combination of the horizontal and vertical hologram data sets, and
    wherein the horizontal data set and the vertical data set are distinct from each other and calculated separately.

14. The laser processing method of claim 13, further comprising:
    setting a distance between a phase modulating position and the optical system equal to a focal length of the optical system.

15. A computer readable storage medium encoded with a computer readable program configured to cause an information processing apparatus to execute a method, the method comprising:
    calculating hologram image representing a pattern image to be processed on an object;

generating position displacement data for shifting the pattern image to a prescribed position with respect to a processed surface of the object;

combining the hologram image data with the position displacement data to produce synthetic hologram data; and inputting the synthetic hologram data to a phase modulator to control phase modulation performed on a laser beam, wherein said position displacement data includes either a horizontal hologram data set representing displacement in a direction parallel to the processed surface, a vertical hologram data set representing displacement in a direction perpendicular to the processed surface, or a combination of the horizontal and vertical hologram data sets, and wherein the horizontal data set and the vertical data set are distinct from each other and calculated separately.

16. The computer readable storage medium of claim 15, wherein the horizontal hologram data set has substantially a sawtooth phase distribution profile.

17. The computer readable storage medium of claim 15, wherein the vertical hologram data set has a phase distribution similar to a Fresnel zone plate.

18. The laser processing apparatus of claim 1, wherein the combination of the horizontal hologram data set and the vertical hologram data set includes adding the horizontal hologram data set and the vertical hologram data set together.

* * * * *